Nov. 18, 1941.   A. D. BLUMLEIN ET AL   2,263,376
ELECTRIC WAVE FILTER OR THE LIKE
Filed April 8, 1939   5 Sheets-Sheet 1

INVENTORS
ALAN DOWER BLUMLEIN
HEINZ ERWIN KALLMANN
WILLIAM SPENCER PERCIVAL
BY
ATTORNEY.

Nov. 18, 1941.    A. D. BLUMLEIN ET AL    2,263,376
ELECTRIC WAVE FILTER OR THE LIKE
Filed April 8, 1939    5 Sheets-Sheet 3

INVENTORS
ALAN DOWER BLUMLEIN
HEINZ ERWIN KALLMANN
WILLIAM SPENCER PERCIVAL
BY
ATTORNEY.

INVENTORS
ALAN DOWER BLUMLEIN
HEINZ ERWIN KALLMANN
WILLIAM SPENCER PERCIVAL
ATTORNEY.

INVENTORS
ALAN DOWER BLUMLEIN
HEINZ ERWIN KALLMANN
WILLIAM SPENCER PERCIVAL
ATTORNEY.

Patented Nov. 18, 1941

2,263,376

UNITED STATES PATENT OFFICE 2,263,376

ELECTRIC WAVE FILTER OR THE LIKE

Alan Dower Blumlein, Heinz Erwin Kallmann, and William Spencer Percival, Ealing, London, England, assignors to Electric & Musical Industries Limited, Hayes, Middlesex, England, a company of Great Britain Application April 8, 1939, Serial No. 266,756
In Great Britain June 28, 1938

9 Claims. (Cl. 178—44)

This invention relates to electric wave filters or their mechanical analogues, and is concerned with the provision of means whereby a desired characteristic or characteristics, for example, an amplitude or a phase characteristic, or both, with respect to frequency, may be attained. It is of particular, though not exclusive, application in enabling a filter network to be constructed having desired frequency characteristics in the neighbourhood of the cut-off of the network.

In the transmission of a wide band of frequencies, such as occurs in the vision spectrum in television, over a cable, it is not convenient in practice to construct the necessary amplifiers so as to pass the very low-frequency components of the spectrum. Moreover, while it is possible to allow these components to be attenuated and then later to re-establish them by suitable re-establishing means, yet this method has the disadvantage that a large amount of interference is liable to be induced in the low frequency portion of the spectrum. It is true that the difficulty of low frequency interference may, at least be largely overcome, by special eliminating means of the kind used in re-establishing the very low frequency components, but should the interference contain components of appreciable magnitude in the region of line-repetition frequency, these components will fail to be eliminated. An ideal solution to the problem that naturally presents itself, therefore, is to transfer the entire vision spectrum to a region free from interference by modulating it upon a suitable carrier. This, however, has the effect of doubling the width of the frequency band to be transmitted and accordingly of increasing the difficulty of correcting for the variations with frequency of attenuation and phase delay that are characteristic of the cable. The application of such a solution, therefore, renders desirable the development of a suitable scheme for the transmission of a single side-band, or at least a close approximation to this kind of spectrum.

In a transmission system according to these considerations, a band of frequencies ranging from zero up to some frequency $a$ would, therefore, be modulated upon a carrier of frequency $c$, so as to give a band ranging from $c-a$ up to $c+a$. The carrier frequency $c$ would be chosen, so that the lowest frequency in this band, namely, $c-a$, is somewhat greater than the highest frequency in the vision spectrum, $a$, to enable proper separation of the components of the two bands by filtering, and a further filter would be employed to cut sharply in the region of the carrier frequency $c$ and pass substantially only the band of frequencies lying below $c$. In order, however, to avoid the high attenuation that occurs in transmission at very high frequencies, a second modulation according to the same principles would be employed to shift the band into the region of lower frequencies, but, of course, not so low as to include interference frequencies. After transmission over the cable and through suitable connecting networks and amplifiers to compensate for variations arising from transmission over a cable, the band would be shifted back to the position it had prior to the second modulation and would then be made to beat with a further carrier of frequency $c$ in order to revert to the original band, the summation components being separated off by suitable filtering.

There are, however, considerable difficulties in arriving at an exact replica of the original vision spectrum, and these arise in the filtering process used in the suppressing of one of the side bands. The conditions that must be satisfied in this process, in order that the low-frequency components in the reproduced vision spectrum may possess substantially the same relative amplitudes and phases as originally, are that both the attenuation and phase curves of the filter employed in the suppression shall be skew-symmetrical about the carrier frequency. When these are fulfilled the components of the reproduced band are identical with those of the original band, except for a possible change in amplitudes throughout in some constant ratio and for some constant superposed phase delay.

The satisfying of these conditions is not, however, easily attained with filters of conventional types, since although it may be possible with some difficulty to produce a filter having the desired form of attenuation characteristic, it will usually be found that such a filter will not possess the required form of phase characteristic. It is an object of the invention to provide such a type of filter network that this kind of difficulty is overcome or reduced.

The application of the invention is not limited, of course, solely to electrical networks: or to filters for use in the above-mentioned kind of transmitting systems.

Thus a problem frequently presented in the transmission of electrical signals is to provide a filter with a flat amplitude response over a certain range of frequencies, having also a sharp cut-off at one or both limits of this range, and in some aspects of this problem, particularly those arising in the field of television, there is a restriction added, namely, that the filter must introduce no phase distortion in the band of transmitted signals. With known networks the phase varies near the limits of the band, usually the more violently the sharper the cut-off, and while phase correcting circuits exist and are capable of compensating a comparatively smooth phase characteristic, the problem of attaining a sharp cut without giving rise to severe phase disturbance appears to possess no practical solution according to known methods. The present invention is also of application in overcoming this kind of difficulty.

According to one aspect of the invention, an electric wave transmission network is provided including an artificial line, a cable, or any other equivalent serving to effect a time delay in signals applied to said line, said line being provided with a number of tapping points, and the signals appearing at said tapping points being linearly combined in such a way that a predetermined amplitude characteristic is obtained.

According to a feature of the invention, said tapping points are arranged in pairs, the tapping point of each pair being arranged symmetrically with respect to a predetermined point on said line.

More broadly there is provided according to the invention, an electric wave transmission network, or analogous system, comprising effectively in parallel a plurality of transmission paths, so that the output from said network or system is proportional to the sum of the effective admittances of all of said paths, wherein the magnitudes of said admittances and the associated time-delays are so proportioned that said network or system possesses substantially a predetermined amplitude and/or phase characteristic.

In one form of the invention, each transmission path may comprise an attenuating path connected to a delay network, the phase delay and possible attenuation introduced by said delay network in conjunction with the attenuation and possible phase delay introduced by said attenuating path, affording the required characteristics. The characteristics of said transmission paths may be determined by calculating the transmitted effect as a function of time derived from a device having the said predetermined characteristics, when a driving force of the type expressed by the Heaviside unit function is impressed upon the said device, and so proportioning the attenuation and phase delay of said transmission paths, that the sum of the effects transmitted by said paths when said driving force is applied to said filter or system, is substantially equal as a function of time to said transmitted effect determined by calculation.

In an alternative method the characteristics of said transmission paths may be determined by calculating the time derivative of said transmitted effect when a driving force expressed by the Heaviside unit function is applied to said device, and so proportioning the attenuation and phase delay of said transmission paths that when an impulsive driving force is applied to said filter or system the sum of the impulsive effects transmitted by said paths is substantially equal as a function of time to said time derivative.

In order that the said invention may be better understood and more readily carried into effect, the same will now be described by way of example with reference to the accompanying drawings, in which:

Figure 11b illustrates the nature of the time delay characteristics that are obtained with the arrangement of Figure 11a.

Figure 1:
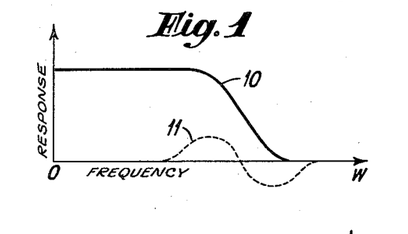
Figure 1 shows a pair of frequency characteristics defining a filter network, and such as might be required for the suppression of one side-band in single side-band transmission.
Figure 2:
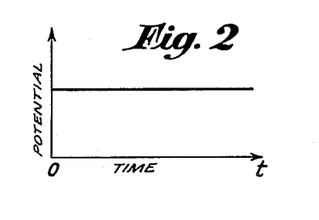
Figure 2 shows an electromotive force as a function of time $t$, which is zero at all instants prior to the time $t=0$, and which is unity for all instants after this time.
Figure 5:
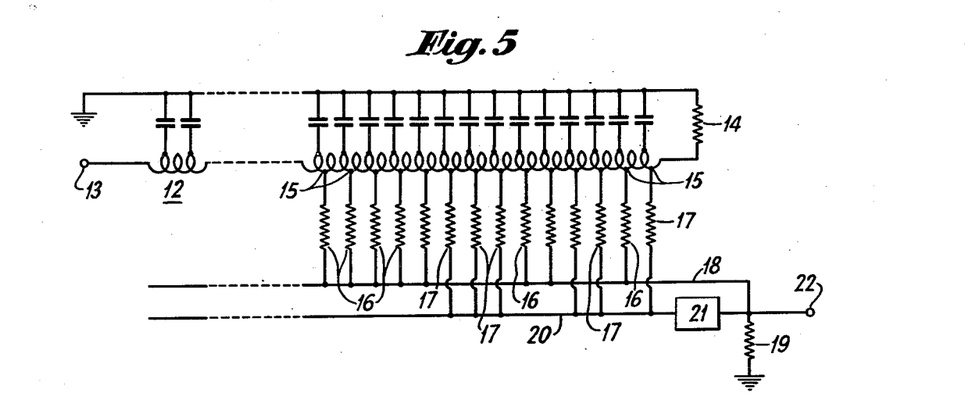
Figure 5 illustrates diagrammatically a practical embodiment of the invention comprising a delay network and a large number of high resistance shunt paths.
Figure 8:
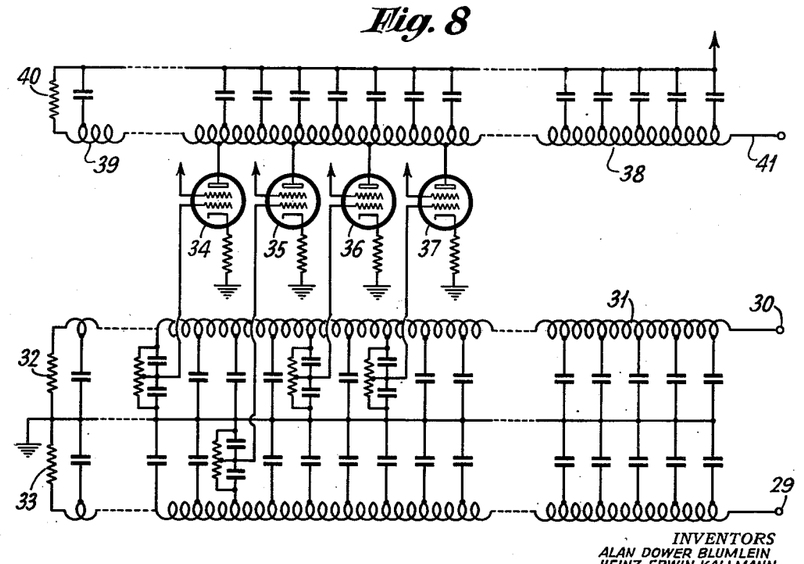
Figure 8 shows a further practical embodiment.

In order to design a network such as is shown in Figure 5 or 8, so that it may possess, for example, the characteristics of Figure 1, it is necessary to be able to calculate the response of the network, corresponding to the desired characteristics, to an applied stepped, or alternatively an impulsive, potential; this calculation will now be briefly discussed. As is well known, if an electromotive force represented by the Heaviside unit function is applied to a wave-filter, namely, a stepped electromotive force as illustrated in Figure 2, the resulting current as a function of that is derived from the filter may be calculated as the Fourier integral $$I(t) = \frac{1}{2\pi j} \int_{-j\infty}^{j\infty} \frac{A(p)}{p} e^{pt} dp$$

In this expression $A(p)$ is the current response of the filter to an applied harmonic electromotive force of frequency $$\frac{\omega}{2\pi}$$

and amplitude equal to unity, $p$ being written for $j\omega$; it is the transfer admittance across the output terminals with respect to a generator across the input terminals and vice versa. In general it may be represented in the form:

$$A(p) = a(\omega) + j\omega \cdot b(\omega)$$

where $a(\omega)$ and $b(\omega)$ are both even functions in $\omega$. In Figure 1 the curves 10 and 11 depict the functions $a(\omega)$ and $b(\omega)$ respectively for a given filter.

With this form for $A(p)$ the current $I(t)$ may be set out in the form:

$$I(t) = \frac{1}{2\pi} \int_{\omega_1}^{\omega_2} \left|\frac{d}{d\omega} a(\omega)\right| \cdot \sin(\omega t) . d\omega +$$

$$\frac{1}{2\pi} \int_{\omega_1}^{\omega_2} \left|\frac{d}{d\omega} b(\omega)\right| \left[\frac{\sin \omega t}{t} - \omega\right] d\omega$$

where the limits of integration cover the ranges of variation of the real and imaginary portions $a(\omega)$, $b(\omega)$ respectively of the filter characteristic.

Figures 3, 4:
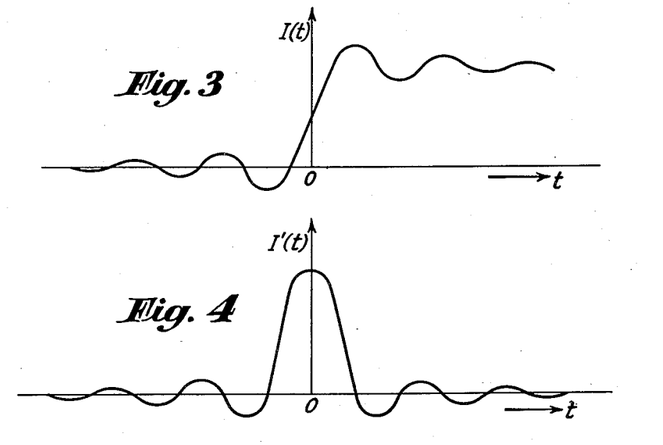
Figure 3 shows as a function of time the current which might be derived from a network having the characteristics shown in Figure 1 when the electromotive force described by means of Figure 2 is applied to it.
Figure 4 illustrates the form of the derivative with respect to time of the current curve depicted in Figure 3, this derived curve being of the form of the current that would be obtained, if an impulsive electromotive force were applied to the filter instead of that of Figure 2.

Figure 3 shows the kind of current response derived in the case of the low-pass filter defined by the characteristics of Figure 1.

If the above equation is differentiated with respect to $t$ the derivative $I'(t)$ is obtained which may be regarded as the current response of the filter to the application of an impulsive rather than a stepped electromotive force. Such a response with respect to the characteristics of Figure 1 is shown in the figure; it is given generally for values of $t$ greater than zero by $$I'(t) = \frac{1}{2\pi t} \int_{\omega_1}^{\omega_2} \left|\frac{d}{d\omega} a(\omega)\right| \sin \omega t . d\omega +$$

$$\frac{1}{2\pi t} \int_{\omega_1}^{\omega_2} \left\{\omega \left|\frac{d}{d\omega} b(\omega)\right| \cos \omega t - \left|\frac{d}{d\omega} b(\omega)\right| \frac{\sin \omega t}{t}\right\} d\omega$$

When $t$ is zero, the limiting value of the formula becomes $$I'(t) = \frac{1}{2\pi} \int_{\omega_1}^{\omega_2} \omega \left|\frac{d}{d\omega} a(\omega)\right| d\omega$$

The principle upon which the invention is based is that if a filter can be constructed so as to possess the current response $I(t)$ or $I'(t)$ corresponding to the application of the appropriate electromotive force and corresponding also to desired characteristics $a(\omega)$, $b(\omega)$, then it will possess necessarily these characteristics.

Figure 5 provides an illustration of the manner in which this principle may be applied, and shows a network comprising a delay network 12 to the input terminal 13 of which signals are impressed, and which is terminated in the terminating resistance 14. At various points 15 on this delay network there are connected high resistances 16, 17, as shown. Those denoted by the reference numeral 16 are connected to the line 18 and thence to earth through the comparatively small resistance 19; those by 17 are taken to the line 20 which is connected through the phase reversing device 21 to the resistance 19 and through this resistance to earth. The signals developed across the resistance 19 may be taken off from the terminal 22.

Suppose now that it is desired that this network should have the characteristics illustrated in Figure 1. These characteristics as will already been noticed from Figures 3 and 4 are physically non-realisable if taken by themselves alone. They may, however, be reproduced to any desired degree of accuracy if combined with the characteristics of a delay network possessing a sufficiently large delay; the response $I(t)$ or $I'(t)$ for the combination would then lie in the region of $t > 0$. In what follows the presence of a sufficient superposed delay will always be assumed and understood; for example, a sufficient shift of the time origin to the left in a calculated response curve will be understood, although not actually shown. In cases where the characteristics are physically realisable by themselves no additional delay is, of course, needed.

Figure 6:
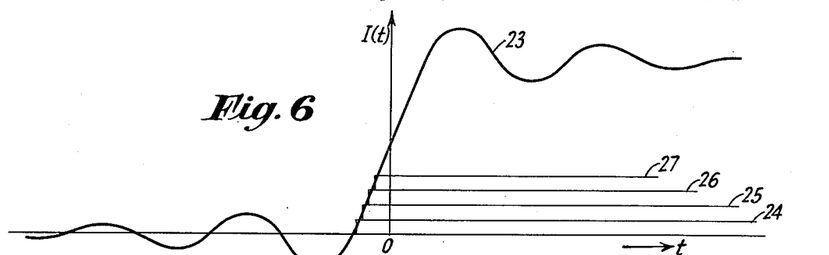
Figures 6 and 7 show two ways in which the admittances and the delay times corresponding to the various paths may be determined.

Let curve 23 in Figure 6 represent the calculated response that any device with the characteristics of Figure 1 must have when a stepped electromotive force is applied to it; then the problem is so to proportion the various delays at the points 15 and the various magnitudes of the resistances 16, 17, that when this force is impressed upon a terminal 13 the response at terminal 22 is substantially that represented by the curve 23.

After the electromotive force has been applied there will elapse a small finite time before the disturbance appears at the first tapping point 15 shown in Figure 5, although it is to be understood that tapping points occur prior to this point. A current will then flow in the corresponding first resistance 16 and also in the resistance 19 so that a response appears at the terminal 22 which is a replica of the applied signal but greatly attenuated and having a definite delay. This replica is shown by curve 24 in Figure 6 the delay having been suitably proportioned. After, however, a short interval a further stepped replica will be added at terminal 22 due to the second resistance 16. Thus the curve 25 is obtained commencing in two small steps; the further curves 26, 27, show the effect of the next two tapping resistances. By suitably adjusting the spacing between the tapping points 15 and keeping the magnitudes of the resistances constant, or by using a fixed spacing and correctly choosing the magnitudes of the tapping resistances, or by employing a combination of both those methods, it will be evident that it is possible to build up a response curve which follows very closely, only in small steps, the curve 23. Where it is necessary to perform subtractions the resistances are connected to a line, the line 20, which introduces a phase reversing device. It will be clear that stepped contributions must continue to be added appropriately until the whole arrival curve 23 has been reproduced in this way, or at least it must be reproduced in either direction until the point is reached where the oscillation amplitude is substantially of the order of the amplitude of a stepped contribution.

Various other conditions that must be satisfied will also be evident. Thus the shunt resistances 16, 17, must individually be of sufficient magnitude not to affect the functioning of the delay network to an appreciable degree; or, if it is not convenient to employ resistances of such magnitude, then series elements of resistance must be connected in the delay network in order that the non-dispersive Heaviside condition may be restored; if this alternative is adopted, then attenuation along the length of the network must be allowed for in choosing the magnitude of the shunt resistances. The resistance 19 will require to be made so small that the greatest potential difference ever developed across it is inappreciable compared with the applied potential. It will be appreciated that the resistances 16, 17 and 19 may be replaced, if desired, by impedances of any kind, though preferably all of the same nature.

The delay network itself will necessarily require to possess a very high cut-off frequency indeed, in order that the delay may be constant over and above the frequency range within which the filter will have to function; preferably the delay network is of the m-derived type, giving a substantially constant phase delay in the working range.

If these precautions are taken, it is found that a very close approximation to a desired pair of frequency characteristics may be obtained. Of course, the theoretical time origin is not achieved but within an assignable accuracy the curve of Figure 1 may be obtained together with the effect of a greater or lesser time delay. Where, of course, predetermined characteristics are physically realisable apart from an added delay, any superposed delay is unnecessary, but may, if desired, be incorporated.

Figure 7:
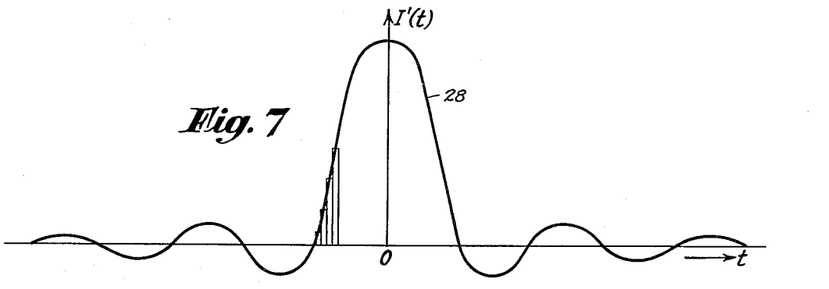

Figure 7 shows an alternative way in which the various resistances and associated delays may be determined. The curve 28 is that obtained by differentiating the curve 23 in Figure 6 with respect to time, but is actually calculated directly from the characteristics of Figure 1, which characteristics it is desired that the filter should have; as already stated, it is the response determined by these characteristics corresponding to the application of a very short duration impulse. If such an impulse were applied to terminal 13, then owing to the various delays of the different paths between terminal 13 and terminal 22, and the different resistances of these paths, a succession of impulses of different magnitudes would appear at terminal 22. It is clear that it is only necessary to choose correctly these delays and resistances in order to build up as close an approximation to the curve 28 as is desired. Where there is a change of sign, impulses are inverted by arranging that they should be passed through a phase-inverting device, this being effected by connecting the respective resistances to the line 20, which is further connected to the device 21.

The various elements 24, 25, 26, 27 used to build up the curve 23 in Figure 6, and also the elements used to build up the curve of Figure 7 have been shown for simplicity beginning near the zero of the time axis where the curve is steep. In practice the first tappings on the delay network must begin well to the left of this axis so as to include the oscillations of the wave prior to the zero of the time axis. Such elements have not been shown, but must be included if an accurate result is desired.

It will be evident that there are some cases not soluble in practice by the methods proposed according to this invention; these will be all those in which the functions $I(t)$ or $I'(t)$ are not fairly convergent to a limit, this limit being some finite quantity in the case of $I(t)$ and zero for $I'(t)$. If these functions, instead of converging, tend to oscillate without appreciable decay, the length of delay network required tends to become impracticably large, and the invention cannot be applied.

In the embodiment of the invention according to Figure 5, there necessarily arises a large degree of attenuation which, however, may be neutralised by means of subsequent amplification. In Figure 8 there is shown diagrammatically an arrangement where this amplification occurs in the various transmission paths themselves, the network being such in fact as to provide some degree of gain if so desired; apart from this the network is constructed upon the same basic principles that apply in the case of the network shown in Figure 5.

Referring to Figure 8, the terminals 29 and 30 form the input to a balanced delay network 31 as shown which is terminated in the terminating resistances 32, 33. The shunt arms comprise pairs of equal capacities connected in series, all the joins being earthed as shown, as is the join of the terminating resistances 32, 33. Some of these capacities comprise a pair of condensers in series acting as a potentiometer to provide a signal of suitable magnitude at the grid of a valve. In this way a number of valves, of which those having the reference numerals 34, 35, 36, 37, are typical, are fed from various points on the delay network 31. In order that the arrangement may operate at very low frequencies the condenser potentiometers may have connected in parallel with them resistance potentiometers of the same ratio and employing high resistance leaks. The gains of the valves, which preferably all have the same characteristics, may be stabilised by means of suitable cathode resistances, and signals of opposite signs may be applied to the grids according as they are taken from potentiometers inserted in one side of the line or in the other. The anodes of the valves are taken to different points on a further delay network 38, terminated at the end by a resistance 40, but not necessarily terminated at the output end 41. The delays and effective admittances of the various paths are determined according to either of the two methods explained previously. The delays, of course, include the delays in both delay networks. Grid and anode capacities form part of the shunt capacities in the delay networks with which they are associated. Residual anode grid capacities may be neutralised by suitable capacitative connections to the opposite side of the delay network to which the grids are connected.

Various possible modifications will be evident in this arrangement, for example, the delay network 31 need not necessarily be balanced and phase reversing stages might be employed where necessary; or the anodes of the valves 34, 35, 36, 37, etc., might be taken to a pair of lines such as 18 and 20 in Figure 5 in one of which is a phase reversing device. Another alternative would be to use a balanced delay network in place of the unbalanced delay network 38, taking some anodes to one side and others to the opposite sides of this network.

It will be appreciated that one type of filter having been constructed, other types may be derived from it by simple processes; for example, by subtraction. Thus, if a low-pass filter has been constructed a high-pass filter with a complementary characteristic may be formed by adding the input signals to the filter, after suitable amplitude modification and a change in phase, to the signals derived at the output, so that the low frequency signals are annulled, leaving only the desired high frequency signals. By connecting two suitable filters in series, one a low-pass filter and the other a high-pass, their pass bands overlapping, a band-pass filter may be derived; or, if they are connected in parallel, their passbands not overlapping, a rejection effect over a desired band may be obtained. These methods may obviously be extended, thereby avoiding considerable labour otherwise involved in the calculation of arrival curves.

As already stated, the invention is, of course, not limited in its application to filters for use in single side band transmission hereinbefore referred to, but may be employed to provide filters in other circumstances where predetermined characteristics are required; for example, it may be applied to reduce or eliminate, without introducing phase disturbances, the noise components lying beyond the normal vision spectrum and resulting from the need, in equalising the attenuation and phase variations caused by transmission over a cable, for including correction at frequencies up to several octaves beyond the highest frequencies transmitted. Features of the invention of special, but not exclusive application in such a case will now be described with reference to the Figures 9 to 18 of the accompanying drawings.

Figure 9:
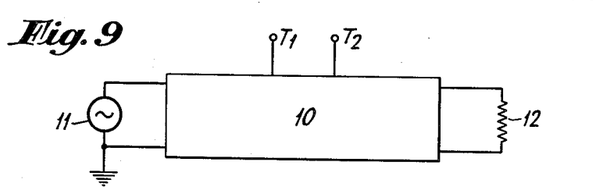
Figure 9 shows delay means fed at one end from a source and terminated at the other in its image impedance, provided with two tapping points, this figure being intended for the elucidation, by way of example, of the basic principle underlying a particular feature of the invention.

Referring to Figure 9, there is shown a delay means 10 which is fed at one end with signals from a source 11 and is terminated in its image impedance at the other end by the impedance 12. At two points along its length there are taken tappings $T_1$ and $T_2$. Corresponding to these two tapping points, there will be two delay times $t_1$ and $t_2$ respectively. There will also be two transfer admittances, functions of the angular frequency $\omega$ of the transmitted wave; these may be represented as $F_1(j\omega)$ and $F_2(j\omega)$ respectively; in terms of the delay times $t_1$ and $t_2$ they may be expressed as:

$$F_1(j\omega) = Ae^{-j\omega t_1}$$
$$F_2(j\omega) = Ae^{-j\omega t_2}$$

The addition of these admittances gives a resultant admittance:

$$F_1(j\omega) + F_2(j\omega) = 2Ae^{-j\omega \frac{1}{2}(t_1+t_2)} \cos \tfrac{1}{2}\omega(t_1-t_2)$$

This represents a response having a delay equal to the average of the delay time $t_1$ and $t_2$ and an amplitude which varies as the cosine of the frequency $\omega$. By taking other pairs of tappings other responses of the same nature, but with different delays, and more slowly or more rapidly varying amplitude laws, can clearly be obtained. In particular, it can be arranged that the delay times for each pair are the same, and that the amplitude laws are given by the cosine terms of a Fourier expansion. Thus setting $$\tfrac{1}{2}(t_1+t_2) = T$$

and $$\tfrac{1}{2}(t_1-t_2) = r\tau$$

$\tau$ being equal to half the delay time that occurs between consecutive tapping points, the general $r$th term may be obtained as $$e^{-j\omega T}2A_r \cos r\omega\tau$$

$A_r$ may easily be arranged to be different for different pairs. It is then only necessary to choose correctly the different coefficients $A_r$ and to employ a sufficient number of pairs of tapping points, to be able to approximate as closely as may be desired, in a given frequency range, to any particular amplitude response having a substantially constant associated time delay, provided, of course, that this amplitude response can be represented as an even function of frequency. This response may have any mean value by arranging to add in, in proper magnitude, a term representing a wave derived from a tapping point situated on the delay means so as to have the average delay $T$.

In a precisely similar manner any response which is an odd function of frequency may be derived if the transfer admittances of the pairs are subtracted instead of added. Subtraction gives the resultant admittance $$F_1(j\omega) - F_2(j\omega) = e^{-j\omega t}2jB_r \sin r\omega\tau$$

for the $r$th pair, where $B_r$ is a coefficient similar to $A_r$. Here it will be noticed there is a superposed phase lag of $\pi/2$. At high frequencies this phase shift will have little effect on the time delay; at lower frequencies, if a constant time delay is desired, it may be necessary to employ a phase correcting network. With an even function response the necessity for such correction does not arise.

Figure 10:
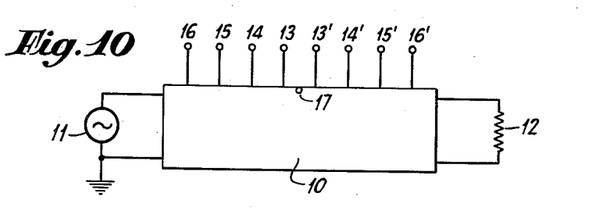
Figure 10 shows in accordance with this feature of the invention an arrangement such as that illustrated in Figure 9, to the delay means of which there are applied a number of equally spaced tapping points arranged so as to lie symmetrically about a predetermined point in the delay means.

Figure 10 shows diagrammatically an arrangement that may be employed in accordance with the above principles. The delay means 10 may comprise some suitable form of delay network or cable, and is fed with signals from a source 11 at one end; the other being suitably terminated by an impedance 12 to render that end reflectionless. 17 is a point on the delay means 10 about which the tappings 13—13', 14—14', 15—15', 16—16' are symmetrically disposed in pairs as shown. Only four such pairs are shown, but, of course, it will be understood that as many more may be added as desired.

Figure 11A:
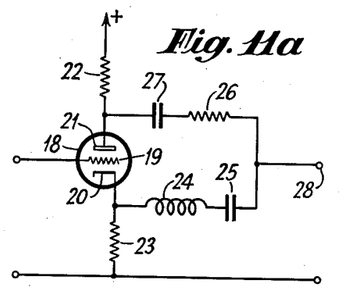
Figure 11a illustrates a phase correcting network one or more of which may be employed for modifying the phase characteristic obtained with an arrangement according to Figure 10, if such phase modification should be necessary.
Figure 11B:
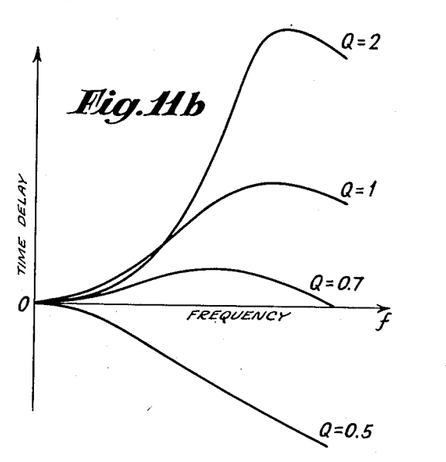

To obtain a desired amplitude response it is necessary to combine the outputs from the tapping pairs 13—13', 14—14', 15—15', 16—16' and others if present in accordance with the principles set out above; namely, it is necessary to add or subtract the equal amplitude outputs from the tapping of each pair and to proportion correctly the relative amplitudes associated with the various pairs. This may be done by means of the special cathode ray tube illustrated in Figure 19 which will be referred to in more detail later; other methods achieving the same result may, of course, be employed. To eliminate the phase shift, already referred to, associated with the case in which subtraction is effected giving rise to the sine terms of a Fourier expansion, a phase correcting network as illustrated in Figure 11a may be used. In this circuit signals are applied to the grid 19 of the valve 18 whose anode and cathode circuits comprise the equal resistances 22 and 23 respectively. The anode 21 is taken through the blocking condenser 27 and the resistance 26 of magnitude R to the output terminal 28, while the cathode 20 is connected to the same terminal through the inductance 24 and capacity 25 of magnitude L, C respectively. The time delay as a function of frequency $f$ introduced by the circuit is illustrated for various values of the parameter $$Q=\frac{1}{R}\sqrt{\frac{L}{C}}$$

in Figure 11b. More than one such network may be employed and suitable combination of the characteristics thus provided enables the necessary phase correction to be effected. The network as described here is a particular case of phase shifting network covered in British Patent No. 473,028.

Figure 12A:
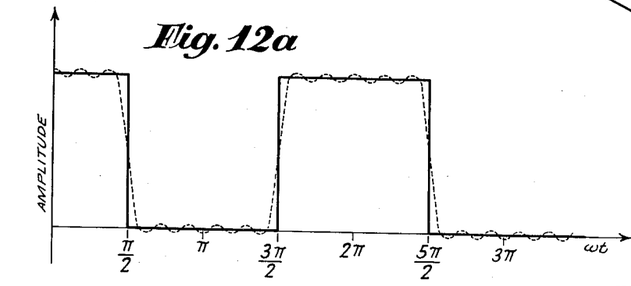
Figure 12a shows an amplitude characteristic that may be provided by the filter arrangement illustrated in Figure 10, the full line curve representing an ideal case when an infinite number of tapping points are employed, and the dotted curve showing the kind of response provided when only a few are used.

Figure 12a shows, as an example of the use of the arrangement of Figure 10, an amplitude characteristic, in which amplitude is plotted against the variable $\omega t$, the example being one in which only the cosine terms of a Fourier expansion enter, that is one in which the outputs of the tappings of the various pairs are added. The various amplitudes corresponding to the various pairs of tappings are chosen in accordance with the magnitudes of the coefficients of the harmonic terms in the Fourier series:

$$\frac{1}{2}+\frac{2}{\pi}\left(\cos \omega\tau - \frac{1}{3}\cos 3\omega\tau + \frac{1}{5}\cos 5\omega\tau - \ldots\right)$$

The constant term $$\frac{1}{2}$$

in this series determines the amplitude corresponding to the tap 17 in Figure 10. The coefficient $$\frac{2}{\pi}$$

determines the amplitude with respect to the tapping pair 13—13'; the coefficient $$-\frac{2}{3\pi}$$

determines that with respect to the tapping pairs 14—14', and so on. The sign of the coefficient determines the sense in which the outputs of the various pairs are to be combined. As will have been realised, the spacing between consecutive tappings is the same.

The full line curve in Figure 12a shows the response that would be obtained if an infinite number of tapping points were employed. This, of course, is not realisable since it would demand in practice an infinitely long time delay. However, a close approximation can be made to this limiting case even if only a few tappings are used. The dotted curve in Figure 12a shows the result when only three pairs of tappings are employed.

Figure 12B:
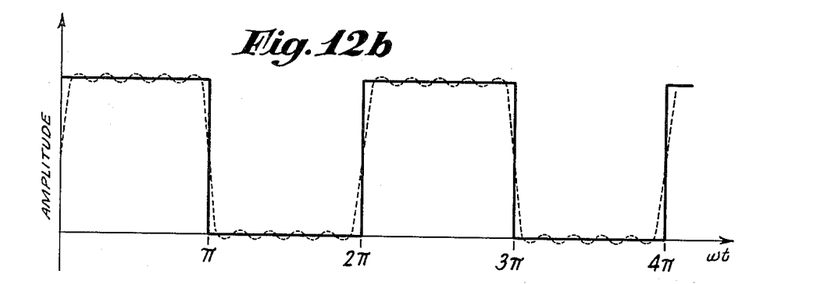
Figure 12b shows a further characteristic obtainable with the same arrangement, but utilising a different combination of taps.

Figure 12b illustrates the form of the response provided by the same arrangement when instead of adding the outputs from the tappings of each pair these are subtracted. In this case phase correction may be necessary at low frequencies if a variable time delay at such frequencies is undesirable. The full line curve represents the ideal case corresponding to the infinite series; the dotted curve is the characteristic provided by three pairs of tappings.

In the response curve of Figure 12a the first cut-off frequency is reached when $$\omega t = \frac{\pi}{2}$$

This cut-off frequency is, therefore, given as $$\frac{1}{4\tau}$$

From this fact the positions of the tapping points can be calculated in specific cases. In the case of the response curve of Figure 12b the first cut-off frequency is $$\frac{1}{2\tau}$$

It will be appreciated that the greater the number of tapping pairs, that is the greater the number of terms forming the series, the sharper can the cut-off be made. The more tappings, however, the greater the delay time T. It can be shown in fact that if $\Delta f$ is the frequency interval in which cut-off takes place, then approximately $$T=\frac{1}{2\Delta f}$$

A very rapid cut-off, therefore, necessarily involves a network having a long time delay.

Provided the attenuation in the delay means is negligible at all frequencies, then in the response curves of Figures 12a and 12b a whole series of equal pass-bands interposed by equal stop-bands is derived. All the bands have comparatively sharp cut-regions and, of course, any one may be selected by conventional filters. These will introduce phase distortion, of course, but this can often be arranged to lie in regions where such distortion is not of serious effect, or where it may be comparatively easily corrected.

Figure 12C:
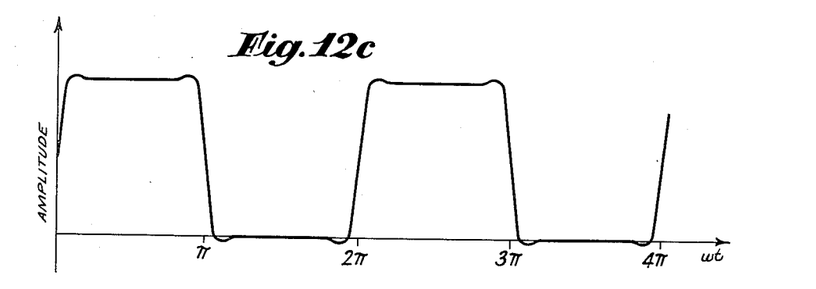
Figure 12c shows another such characteristic.

Figure 12c shows a response curve corresponding to a series of sine terms as follows:

```
        sin ωt
   .32  sin 3ωt
   .17  sin 5ωt
   .10  sin 7ωt
   .053 sin 9ωt
   .025 sin 11ωt
   .008 sin 13ωt
```

This particular response curve has the virtue of passing a transient of step form with very little overswing and with no "ringing."

With regard to the delay means referred to and indicated diagrammatically in Figures 9 and 10, no special description is necessary. It may comprise one of the usual delay networks or a low-pass filter network with lumped constants and with a cut-off at a sufficiently high frequency; alternatively, a length of cable may be employed. It is desirable to make the time delay of the network approximately constant up to some frequency which is rather greater than the highest pass frequency. In the example provided by the first pass-band in the response curve of Figure 12a, where the first cut-off frequency is given as $$\frac{1}{4\tau}$$

as mentioned earlier, it would be desirable if it were required to use this pass-band only for the purpose of obtaining a low-pass effect, to arrange that the time delay should be constant up to, say, about $$\frac{3}{2}$$

of this frequency, namely $$\frac{3}{8\tau}$$

It will be appreciated that if there are $n$ pairs of tappings the time delay will be at least as great as $nT$.

The foregoing has been written from the point of view of obtaining rapid changes in attenuation with frequency without at the same time obtaining changes in delay time, or at least without obtaining changes which may not easily be compensated for by simple compensating means. In satisfying these requirements the invention has important application, as will have been appreciated; however, in such application it is not necessary to employ precisely the methods already described, as will now be clear.

Thus, suppose, for example, it is required to obtain a transfer admittance of the general form $$F(j\omega) = e^{-j\omega T}\{f(\omega) + jg(\omega)\}$$

where $f(\omega)$ is an even function and $g(\omega)$ an odd function. This admittance could be produced by building up $f(\omega)$ in accordance with the methods already set out, namely, by building up a cosine series by the process of addition of tapping outputs, and by building up $jg(\omega)$ in a similar way as a sine series, the delays associated with each function, not regarding the variable delay that occurs in the forming of the sine series, being arranged to be equal.

The admittance $F(j\omega)$ may, however, be obtained directly by a single combination process.

Thus consider two tapping points equidistant from the tapping point giving the delay time $T$. The outputs from these tapping points may be expressed as $$Ae^{-j\omega(T-r\tau)}$$

and $$Ae^{-j\omega(T+r\tau)}$$

If a fraction $a_r$ of the first is added to a fraction $b_r$ of the second a resultant output which may be expressed in the form:

$$Ae^{-j\omega T}\{(a_r + b_r)\cos r\omega\tau + j(a_r - b_r)\sin r\omega\tau\}$$

is obtained. From this it will be seen that an admittance:

$$e^{-j\omega T}\left\{\frac{1}{2}A_0 + \sum_{1}^{n}(A_r \cos r\omega\tau + jB_r \sin r\omega\tau)\right\}$$

may be built up in a single combination process. The coefficients $A_1$, $A_2$, $A_3$, etc., $B_1$, $B_2$, $B_3$, etc., are determined by the magnitudes of the fractions expressed generically as $a_r$ and $b_r$; thus:

$$A_r = A(a_r + b_r)$$

and $$B_r = A(a_r - b_r)$$

$$\frac{1}{2}A_0$$

is the amplitude coefficient corresponding to the tapping point giving the delay time $T$.

If the form of $F(j\omega)$ is known, then the coefficients expressed generically as $A_r$ and $B_r$ may be found according to the equations:

$$A_r = \frac{\tau}{\pi}\int_0^{\frac{2\pi}{\tau}} F(j\omega)\cos r\omega\tau\, d\omega$$

$$B_r = \frac{\tau}{j\pi}\int_0^{\frac{2\pi}{\tau}} F(j\omega)\sin r\omega\tau\, d\omega$$

According to an alternative method, if $\phi_r$ is the amplitude of the wave derived from a single tapping defined by the parameter $r$, the transfer admittance $F(j\omega)$ may be built up by a summation covering all values of $r$ from $-n$ to $n$; thus $$F(j\omega) = \sum_{-n}^{n}\phi_r e^{jr\omega\tau}$$

With $F(j\omega)$ given the amplitudes expressed generally by $\phi_r$ can be calculated according to $$\phi_r = \frac{\tau}{2\pi j}\int_0^{\frac{2\pi j}{\tau}} F(j\omega)e^{-jr\omega\tau}d(j\omega)$$

Figure 13:
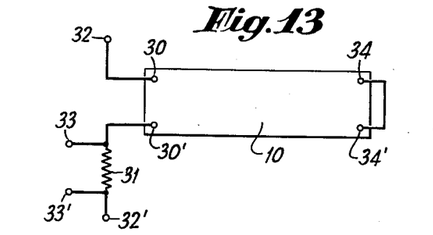
Figures 13, 14, 15 and 16 show other methods in accordance with the invention, differing from that of Figure 10, for utilising delay means so as to obtain desired characteristics.

Figure 13 illustrates another arrangement differing from that of Figures 9 and 10 by which an amplitude response of the form given by a cosine or sine term can be produced. 10 is a delay means whose input terminals 30, 30' are in series with the impedance 31 which is equal to the characteristic impedance of the delay means, and a source not shown which is applied across the terminals 32, 32'. This is supposed to be of zero internal impedance, but if this is not the case, it is simply necessary that the total impedance presented to the input terminals 30, 30' of the delay means shall be substantially equal to the characteristic impedance of the delay means. The output is taken from terminals 33, 33' connected to the resistance 31. The terminals 34, 34' are either joined directly together, or else are left open circuited. In either case the output obtained from the terminals 33, 33' is the sum of the wave directly incident on the delay means from the source and of the wave reflected back from the terminals 34, 34' at the far end.

If the terminals 34, 34' are short-circuited, then the response is of the form $$e^{-j\omega t}\cos \omega t$$

where $t$ is the time taken for a wave to travel from one end of the delay means to the other. If the terminals 34, 34' are open-circuited the response is of the form $$e^{-j\omega t}j\sin \omega t$$

Figure 14:
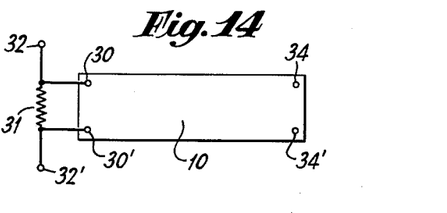

Figure 14 illustrates an arrangement which is effectively the inverse of that of Figure 13. Thus the impedance 31 equal in magnitude to the characteristic impedance of the delay means 10 is connected in parallel with the input terminals 30, 30' of the delay means instead of being arranged in series; also the source is of infinite impedance, or is substantially so, instead of being of zero impedance. The input terminals are now also the output terminals.

The principle is the same as in Figure 13. When the terminals 34, 34' are short-circuited, the response is of the form $$e^{-j\omega t}j\sin \omega t$$

and when open-circuited it is of the form $$e^{-j\omega t}\cos \omega t$$

Figure 15:
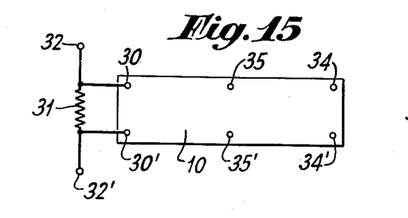

Figure 15 shows a slight modification of the arrangement of Figure 14 which is particularly convenient practically. It is identical with that of Figure 14 in fact, except that the output is now taken from terminals 35, 35' located at some point on the delay means intermediate the input terminals 30, 30' and the terminals 34, 34' at the far end. If the delay time between these last-mentioned pairs of terminals be represented by $at$ and that between the output terminals 35, 35' and the end terminals 34, 34' by $bt$, the response at the output terminals is like $$e^{-ja\omega t} \cos b\omega t$$

if the terminals 34, 34' are left open, and is like $$e^{-ja\omega t} \sin b\omega t$$

if they are closed. By employing a number of pairs of output terminals each having its own appropriate value of $b$ it will be seen that a cosine or a sine series of terms may be built up by addition in the correct proportion and sense. Moreover, in either case this can be effected with a delay means of total delay only half that required when the method according to the arrangement of Figure 10 is employed.

Figure 16:
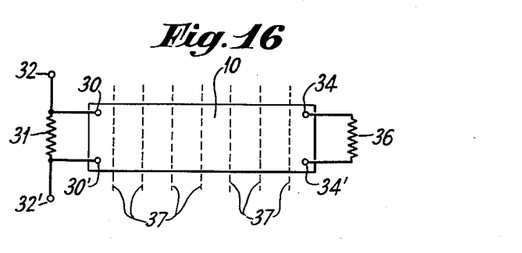

Figure 16 shows an arrangement of particularly simple form by which the quite general exponential series already discussed may be built up. The arrangement is identical with that of Figure 14, except that the terminals 34, 34' at the far end of the delay means 10 are shunted by an impedance equal to the characteristic impedance of the delay means, so that there are no reflections from the end; also at points along the length of the delay means equally spaced apart with respect to delay, those indicated by the dotted lines 37 in the figure, there are discontinuities in the characteristic impedance. These discontinuities may be such as to reflect back waves of either sign to the input terminals 30, 30'. If the discontinuities are small, then the effect of multiple reflections can be substantially avoided; if appreciable they can to some extent be allowed for in design. The reflected waves at the input terminals 30, 30' constitute effectively the various terms in the exponential series referred to above; the amplitude and sense of each term represented generically by the magnitude and sign of the coefficient $\phi_r$, the coefficient corresponding to the $r$th discontinuity, are detemined by the magnitude and the sense of the discontinuity. A decrease in impedance will produce a wave of one sign, an increase the opposite. It will be appreciated that it is necessary to balance out by some means the wave directly incident upon the input terminals 30, 30'.

Figure 17A:
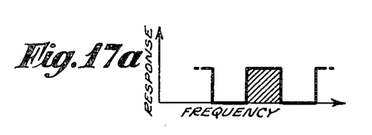
Figures 17a, 17b, 17c and 17d are intended to illustrate the application of the invention to obtaining a low-pass characteristic having a very sharp cut in the high frequencies, this involving the use of time delay means with only a very few tapping points.
Figure 17B:
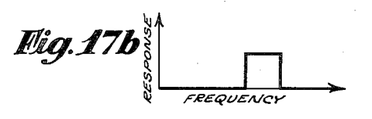
Figure 17C:
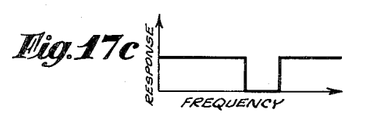
Figure 17D:
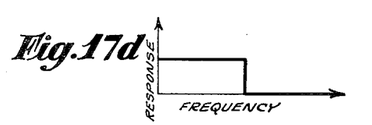

Figures 17a, 17b, 17c, 17d illustrate one manner in which the invention may be applied to produce a low-pass response with a sharp cut-off. If the pass-range is extensive methods of application as already described would involve the use of a large number of tapping points. This number can be very considerably reduced by the incorporation of filters of conventional type. If such filters are used, then it is only necessary, by employing the methods of the invention as already described, to produce a band-pass response with constant time delay covering a small frequency range just above the required cut-off frequency. Such a response which can be produced using very few taps is illustrated in Figure 17a, the particular pass-range just referred to being shown shaded. There are, of course, other pass-ranges present, their presence being indicated in the figure, but these can be removed by the use of a band-pass circuit, which need not have a constant time delay except over the range covered by the shaded pass-band. Thus the pass-response of Figure 17b is derived. If the signals passed by this characteristic are subtracted from the whole of the original signals after they have been subjected to an equal delay, then the band stop characteristic shown by Figure 17c will be derived. It is then necessary to remove the upper pass-band by a second auxiliary filter to derive the desired sharp-cut low-pass characteristic illustrated in Figure 17d. In obtaining the repetitive characteristic of Figure 17a a band-pass delay network of relatively few sections is all that need be employed.

Figure 18A:
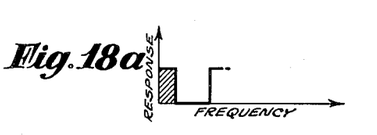
Figures 18a, 18b, 18c and 18d similarly illustrate the application of the invention to obtaining a band-pass characteristic in which the highest frequency transmitted is of the order of ten times the lowest and in which a very short cut is required at the low frequency end.
Figure 18B:
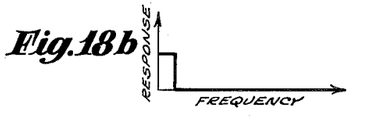
Figure 18C:
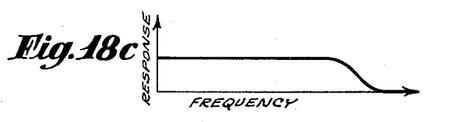
Figure 18D:
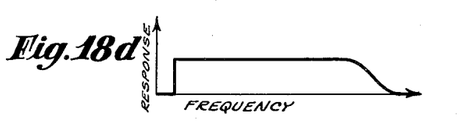

Figures 18a, 18b, 18c, 18d show a similar application to the case where it is desired to obtain a band-pass characteristic in which the higher cut-off frequency is, say, ten times the lower cut-off frequency, and in which a relatively sharp cut is required on the low frequency side of the band. Such a response is useful in connection with single side-band transmission, but without the use of conventional auxiliary filters would require, as was the case in the immediately preceding example, a very large number of tapping points; that is, if produced entirely by the methods described earlier in the specification. Using auxiliary filters, however, the shaded narrow-band low-pass response curve shown in Figure 18a is first obtained, this requiring a delay network of comparatively small delay and having few tapping points. The higher frequency repetitions are then removed by an ordinary low-pass filter of wider pass-band. Thus the low-pass response depicted in Figure 18b is derived. This has only to be subtracted from an appropriate low-pass characteristic of equal delay as shown in Figure 18c to derive finally the required form as illustrated in Figure 18b.

It will be appreciated that the methods illustrated by the last two examples may be applied in other cases where the same difficulties arise, namely, those associated with the use of a large number of taps, if auxiliary filters are not incorporated.

Auxiliary filters of known type may always be employed with advantage in conjunction with networks constructed in accordance with the invention for the purpose of obtaining a very rapid cut-off. By their appropriate use, for example, it is possible to use a delay network which is only designed to be non-dispersive substantially in the range of frequencies below cut-off. At higher frequencies in such a case it will be appreciated that the transmitted phases will tend increasingly to become such that there is no longer cancellation of signals at the output. By employing an auxiliary filter having it cut commencing in the region where cancellation ceases to hold the difficulty of non-cancellation is removed, and a simpler delay network can be used: at the same time a sharp cut-off is still obtained by the network of the invention without substantial phase distortion, since with conventional filters phase distortion is not necessarily large except in the region of their cut-off.

In all the examples given above it has been assumed that there is no attenuation in the delay networks employed. This is not a necessary condition since, it will be appreciated that such attenuation may easily be allowed for in the process of correctly proportioning the various coefficients. It is also possible to allow for variations in attenuation or time delay with frequency. This may also be done by a filter arranged in cascade. Such a filter may be of conventional type or one constructed in accordance with the invention.

Figure 19:
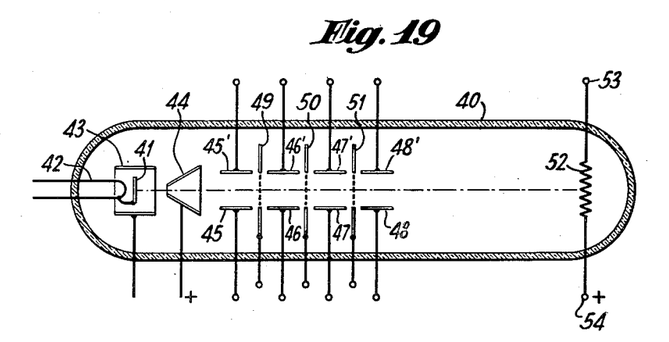
Figure 19 illustrates a special type of cathode ray tube by means of which the signals appearing at the various tapping points on the delay means shown in Figure 10, for example, may be linearly combined in accordance with a feature of the invention.

Figure 19 shows an electronic device by which the various additions and subtractions referred to previously may be very conveniently effected. This device forms the subject-matter of co-pending British application No. 4940/39. Within the evacuated envelope 40 there are located an emitting cathode 41 heated by the heater element 42, a pair of electrodes 43 and 44, which when suitably biased have at least a rough focusing effect upon the stream of electrons emitted by the cathode 41, the electrode 44 also acting as an accelerating electrode; the pairs of deflecting plates 45—45', 46—46', 47—47', 48—48', shielded from one another by the screening electrodes 49, 50 and 51; and the target anode 52 formed by a uniform strip of resistance material and having one end 54 connected to a point of positive potential with respect to the cathode, the other end 53 providing a point from which an output may be taken from the tube. This output is clearly proportional to the distance between the end 54 and the point at which the electron beam impinges, and so is linearly related to the deflection of the beam. To perform the subtraction previously referred to, the tappings of the various pairs may be connected to opposite plates. Amplitude modifications of the valves corresponding to the various pairs may be achieved by suitable potentiometers or by adjusting the sensitivity of the plates; the latter may be done by suitably spacing and dimensioning them and the adjustment may be assisted by the application of appropriate biasing potentials to the shielding electrodes 49, 50 and 51. Summations of the various pairs of valves may be effected by means of a phase reversal in the circuits which connect to the plates of one side, or by applying each of the potentials of a pair of plates on the same side of the electron beam. From the foregoing remarks the use of the device will be clear in any of the examples previously given.

It may be pointed out that in all examples of the invention in which thermionic devices are not incorporated there is complete reversibility between output and input; namely, an interchange of output and input terminals has no effect on the characteristics of the network.

We claim:

1. An electric wave transmission network for transmitting direct and alternating current components, comprising an artificial transmission line, input terminals therefor to supply potential thereto, terminating terminals for said transmission line, a terminating impedance connected across said terminating terminal, a plurality of tapping points along said artificial transmission line, a plurality of substantially reactance-free current paths each including a resistance connected directly to said tapping points for deriving a plurality of potentials each of said potentials having a predetermined amplitude and phase angle, said phase angles being related to the phase of the potential applied to said input terminals, and means connected to said current paths to produce an output potential representative of the instantaneous summation of the derived plurality of potentials.

2. An electric wave transmission network for transmitting direct and alternating current components, comprising an artificial transmission line, input terminals therefor to supply potential thereto, terminating terminals for said transmission line, a terminating impedance connected across said terminating terminal, a plurality of tapping points along said artificial transmission line, a plurality of substantially reactance-free current paths each including a resistance connected directly to said tapping points for deriving a plurality of potentials each of said potentials having a predetermined amplitude and phase angle, said phase angles being related to the phase of the potential applied to said input terminals, and means connected to said current paths to produce a voltage proportional to selective in-phase or out-of-phase addition of the derived voltage.

3. An electric wave transmission network for transmitting direct and alternating current components, comprising an artificial transmission line, input terminals therefor to supply potential thereto, terminating terminals for said transmission line, a terminating impedance connected across said terminating terminal, a plurality of tapping points along said artificial transmission line, a plurality of substantially reactance-free current paths each including a resistance connected directly to said tapping points for deriving a plurality of potentials each of said potentials having a predetermined amplitude and phase angle, said phase angles being related to the phase of the potential applied to said input terminals, means to selectively add or subtract the derived potentials, and means to produce an output potential proportional to the instantaneous summation of the derived potentials.

4. An electric wave transmission network for transmitting direct and alternating current components, comprising an artificial transmission line having a common potential plane, input terminals therefor to supply potential thereto, terminating terminals for said transmission line, a terminating impedance connected across said terminating terminals, a plurality of tapping points along said artificial transmission line, a plurality of substantially reactance-free current paths each including a resistance connected directly to said tapping points for deriving a plurality of potentials each of said potentials having a predetermined amplitude and phase angle, said phase angles being related to the phase of the potential applied to said input terminals, means to connect predetermined selected current paths for resistances to a first common point, means to connect other selected current paths for resistances to a second common point, a phase inverter connected between said first and second named points, and an output resistor connected between said first named point and said common potential plane.

5. An electric wave transmission network for transmitting direct and alternating current components, comprising an artificial transmission line, input terminals therefor to supply potential thereto, terminating terminals for said transmission line, a terminating impedance connected across said terminating terminal, a plurality of tapping points along said artificial transmission line, a plurality of substantially reactance-free current paths each including a resistance connected directly to said tapping points for deriving a plurality of potentials each of said potentials having a predetermined amplitude and phase angle, said phase angles being related to the phase of the potential applied to said input terminals, means to connect predetermined selected current paths to a first common point, means to connect other predetermined selected current paths to a second common point, a phase inverter connected between said first and second named points, a resistor connected between the junction point of said first common point and said phase inverter and one of said input terminals, and terminal means to derive an output potential across said resistor.

6. An electric wave transmission network comprising an artificial transmission line balanced with respect to a predetermined datum plane, a plurality of thermionic amplifiers each having a cathode, a grid and an anode, a resistance path between each of said cathodes and said predetermined datum plane, direct current connections from each of the anodes to a second artificial transmission line, terminal means to supply operating voltage to all of said anodes, a plurality of tapping points on said first named transmission line, and a resistance path between the grid of each thermionic tube and a tapping point of said first transmission line.

7. An electric wave transmission network comprising an artificial transmission line balanced with respect to a predetermined datum plane, a plurality of thermionic amplifiers each having a cathode, a grid and an anode, a resistance path between each of said cathodes and said predetermined datum plane, direct current connections from each of the anodes to a second artificial transmission line, terminal means to supply operating voltage to all of said anodes, a plurality of tapping points on said first named transmission line, resistance means for selectively supplying potentials from the first named transmission line to the grid of each of the tubes in additive or subtractive relation, and means connected to said second transmission line to derive a potential representative of the instantaneous summation of output potentials of said amplifiers.

8. An electric wave transmission network comprising a uniform artificial transmission line, a plurality of pairs of tapping points located between the ends of said transmission line, each pair of said tapping points being symmetrically positioned with respect to the mid-point of said transmission line, and means to connect a load circuit between each of said pairs of symmetrical positioned tapping points.

9. An electric wave transmission network comprising a uniform artificial transmission line, means to supply potential to said transmission line, a plurality of pairs of tapping points located between the ends of said transmission line, each pair of said tapping points being symmetrically positioned with respect to the mid-point of said transmission line, and means including connections to each pair of symmetrical positioned tapping points to produce instantaneous summation of potentials derived from said tapping points.

ALAN DOWER BLUMLEIN.
HEINZ ERWIN KALLMANN.
WILLIAM SPENCER PERCIVAL.